Feb. 14, 1950

E. B. CAIN 2,497,487

INTERLOCK

Filed May 1, 1946

INVENTOR.
Elmer B. Cain
BY
C. D. Tuska
ATTORNEY

Patented Feb. 14, 1950

2,497,487

UNITED STATES PATENT OFFICE 2,497,487

INTERLOCK

Elmer B. Cain, Collingswood, N. J., assignor to Radio Corporation of America, a corporation of Delaware Application May 1, 1946, Serial No. 666,473

1 Claim. (Cl. 174—52)

Figures 1, 2:
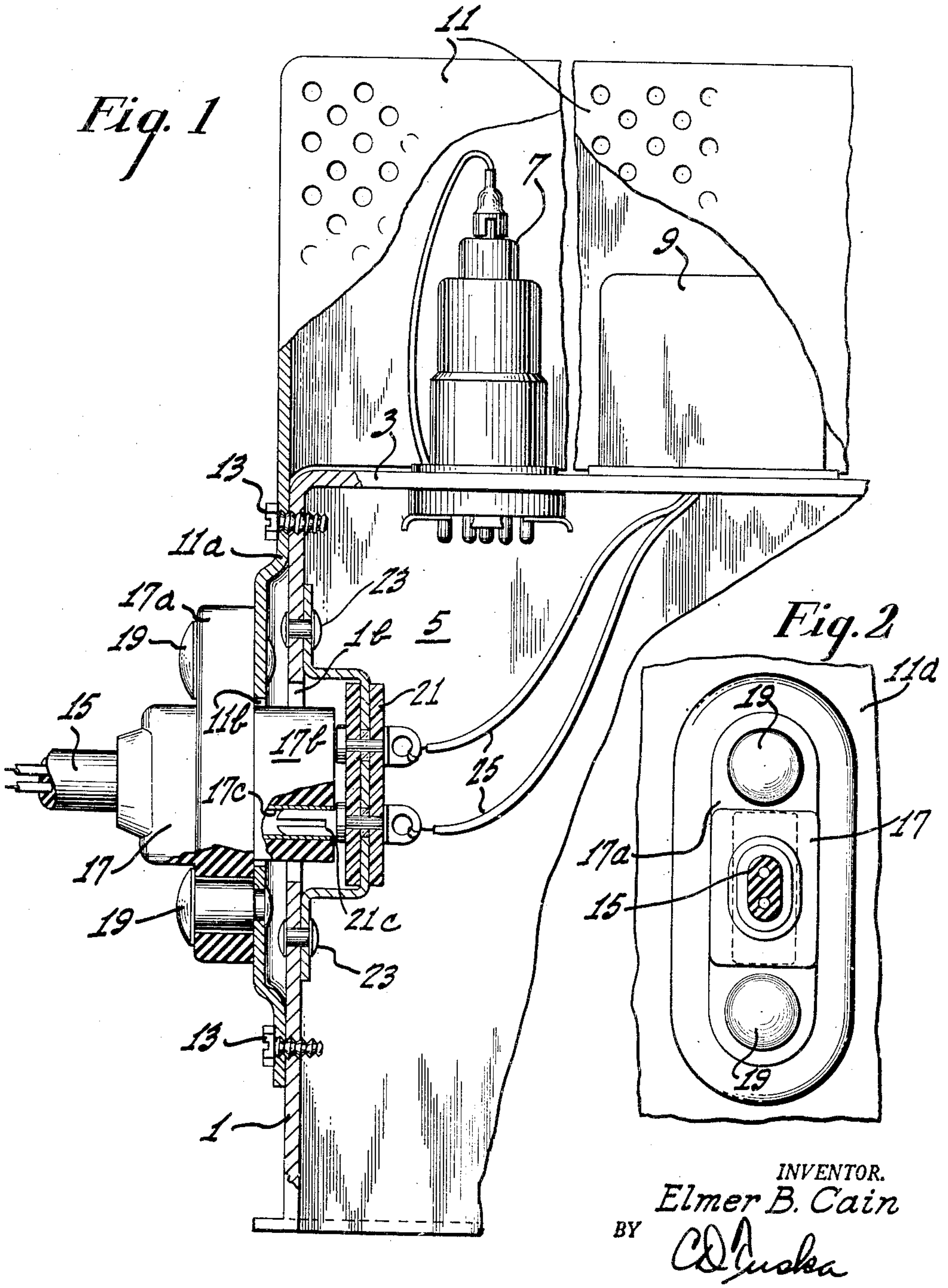

This invention relates to safety systems and devices for electrical apparatus and has special reference to the provision of improvements in so-called "interlocks" for preventing access to the interior of a high voltage compartment so long as the power is on.

In the design of television receivers and other high voltage apparatus for use in the home the practice has been to duplicate the door-switch interlocks commonly employed in high powered commercial installations. Irrespective of the advantages claimed for such interlocks it may be said, generally, that they are more expensive than is desirable in low-cost radio and television receivers and, furthermore, are not always reliable since, through long non-use, the springs or other movable parts of the switch may stick and fail to operate.

Accordingly, the principal object of the present invention is to provide an interlock having no springs or other moving parts and one characterized by its reliable performance and by its rugged yet simple and inexpensive construction.

Another and related object of the present invention is to provide a chassis incorporating an improved power cord interlock which dispenses with the necessity of the full cabinet back conventionally employed in television receiving sets and analogous high voltage installations, and one which shall nevertheless comply in all respects with the safety requirements dictated by the U. S. Board of Fire Underwriters.

Another and specific object of the present invention is to provide a combined strain-relief and interlock for a power cord.

The invention will be described in connection with the accompanying drawing, wherein: Fig. 1 is a side elevation, partly in section, of a television receiver chassis including a power cord interlock and incorporating the invention, and Fig. 2 is a front elevation of the power cord connector of Fig. 1.

In the embodiment of the invention which has been selected for purposes of illustration 1 designates one of the four side walls and 3 the top of a sheet metal chassis or compartment 5 which will be understood to house the wiring and miscellaneous parts of a television receiver or the like. Certain replaceable high voltage parts of the receiver, exemplified by a vacuum tube 7 and a transformer 9, are mounted on the top surface 3 of the chassis and are enclosed on all sides and at the top by a removable cover 11 which rests upon the outer top surface 3 of the chassis. A dependent extension 11*a* of one of the side walls of the cover 11 overlaps the side wall 1 of the lower compartment 5 and is preferably held in position thereagainst by two screws 13.

A power cord 15 for energizing the transformer 9, and hence the other parts of the set terminates in a moulded rubber or similar fixture 17 having a circumferential flange 17*a* which is permanently affixed to the dependent portion 11*a* of the cover 11 as by means of rivets 19. The rivets 19 and the screws 13 thus provide a "strain-relief" for the cord or cable 15. In the instant case the power cord fixture 17 comprises a socket portion 17*b* which extends through a pair of aligned apertures 11*b* and 1*b* in the overlapping sides 11*a* and 1. The socket 17*b* is provided with a pair of metal jacks 17*c* for receiving the complementary prongs 21*c* of a plug-type connector 21 which is permanently affixed, as by rivets 23, to the side wall 1 of the lower compartment 5 and spans the aperture 1*b* therein. Two wires 25 which may be soldered to the inner terminals of the prongs 21*c* conduct the power from the cord 15 to the transformer 9 when the cover 11 is on its base 3 and the separable parts of the socket type connector 17, 21 are connected. With the said parts thus arranged it is impossible to remove the cover 11 from its anchorage 13 at the side of the chassis 1 without breaking the electrical connection between the terminals 17*c* and 21*c*.

When it is desired to remove the cover 11 for the purpose of inspecting the high voltage units which are mounted therebeneath it is merely necessary to remove the screws 13 and to pull the terminal 17 of the cord 15 away from the chassis a distance sufficient to disengage the jacks 17*c* from the prongs 21*c*. Since the terminal 17 is secured (by the rivets 19) to the dependent portion 11*a* of the cover 11 the above described movement causes the cover to slide a similar short distance on its base 3, whereupon the cover may be raised and removed to expose the deenergized high voltage apparatus 7 and 9.

What is claimed is:

In apparatus of the character described, a chassis defining a walled enclosure, high voltage apparatus mounted on the exterior surface of one wall of said enclosure, electrical connections for said high voltage apparatus extending through said wall and terminating in contacts adjacent to the exterior surface of an adjacent wall of said enclosure, a cover defining a compartment for said high voltage apparatus removably mounted on the exterior surface of said first mentioned wall and overlapping said adjacent wall, a power line permanently affixed to said overlapping portion of said removable cover and having electrical terminals mounted to engage the said contacts for said high voltage apparatus upon placing said cover and its said overlapping portion in position with respect to said chassis walls.

ELMER B. CAIN.

REFERENCES CITED

The following references are of record in the file of this patent:

UNITED STATES PATENTS

| Number | Name | Date |
|---|---|---|
| 2,175,025 | Hooven | Oct. 3, 1939 |
| 2,209,213 | Vernon | July 23, 1940 |
| 2,232,746 | Van Emden | Feb. 25, 1941 |